(12) United States Patent
Durkee et al.

(10) Patent No.: US 6,662,650 B1
(45) Date of Patent: Dec. 16, 2003

(54) METHOD AND APPARATUS FOR DETECTING A DRY/WET STATE OF A DUAL EXPOSED THERMISTOR BEAD LIQUID LEVEL SENSOR

(75) Inventors: Scott Robert Durkee, New Haven, VT (US); Keith Eugene Coffman, Shelburne, VT (US)

(73) Assignee: Simmonds Precision Products, Inc., Charlotte, NC (US)

( * ) Notice: Subject to any disclaimer, the term of this patent is extended or adjusted under 35 U.S.C. 154(b) by 5 days.

(21) Appl. No.: 10/314,848

(22) Filed: Dec. 9, 2002

(51) Int. Cl.[7] ............................................. G01F 23/24
(52) U.S. Cl. .............................. 73/295; 73/77; 340/604
(58) Field of Search .............................. 73/73, 77, 295; 340/604; 324/664, 665

(56) References Cited

U.S. PATENT DOCUMENTS

| | | | | |
|---|---|---|---|---|
| 4,872,340 A | * | 10/1989 | de Yong | 73/335.02 |
| 4,901,061 A | * | 2/1990 | Twerdochlib | 340/604 |
| 5,534,708 A | * | 7/1996 | Ellinger et al. | 250/577 |
| 5,880,480 A | * | 3/1999 | Ellinger et al. | 250/577 |
| 6,208,254 B1 | * | 3/2001 | McQueen et al. | 340/603 |

* cited by examiner

Primary Examiner—Hezron Williams
Assistant Examiner—Rodney Frank
(74) Attorney, Agent, or Firm—David R. Percio; Calfee, Halter & Griswold (57) ABSTRACT

A method of detecting a dry/wet state of a dual thermistor bead sensor over a wide operating temperature range comprises the steps of: conducting first and second predetermined currents through one and another of the thermistor beads of the sensor, respectively, the second predetermined current being substantially less than the first predetermined current; measuring a first voltage across the one thermistor bead in response to the first predetermined current and generating a first signal representative thereof; measuring a second voltage across the other thermistor bead in response to the second predetermined current and generating a second signal representative thereof; modifying the second signal by an offset and gain to generate a third signal; and detecting the dry/wet state of the sensor over the wide operating temperature range based on the first and third signals. The first predetermined current is conducted through the one thermistor bead at an average current which renders the one thermistor bead a sense thermistor bead, and the second predetermined current is conducted through the other thermistor bead at an average current which renders the other thermistor bead a reference thermistor bead. Apparatus for implementing this method is also disclosed.

38 Claims, 6 Drawing Sheets

Fig. 1

Fig. 2
(BACKGROUND)

METHOD AND APPARATUS FOR DETECTING A DRY/WET STATE OF A DUAL EXPOSED THERMISTOR BEAD LIQUID LEVEL SENSOR

BACKGROUND OF THE INVENTION

The present invention is directed to thermistor bead type sensors for sensing the level of liquid in a container, in general, and more particularly, to a method and apparatus for detecting a dry/wet state of a dual exposed thermistor bead liquid level sensor in which current is conducted through one thermistor bead at a substantially greater level than through the other thermistor bead, including circuitry for detecting the dry/wet state of the sensor over a wide temperature range from the resulting voltages of both of the thermistor beads.

Figure 1:
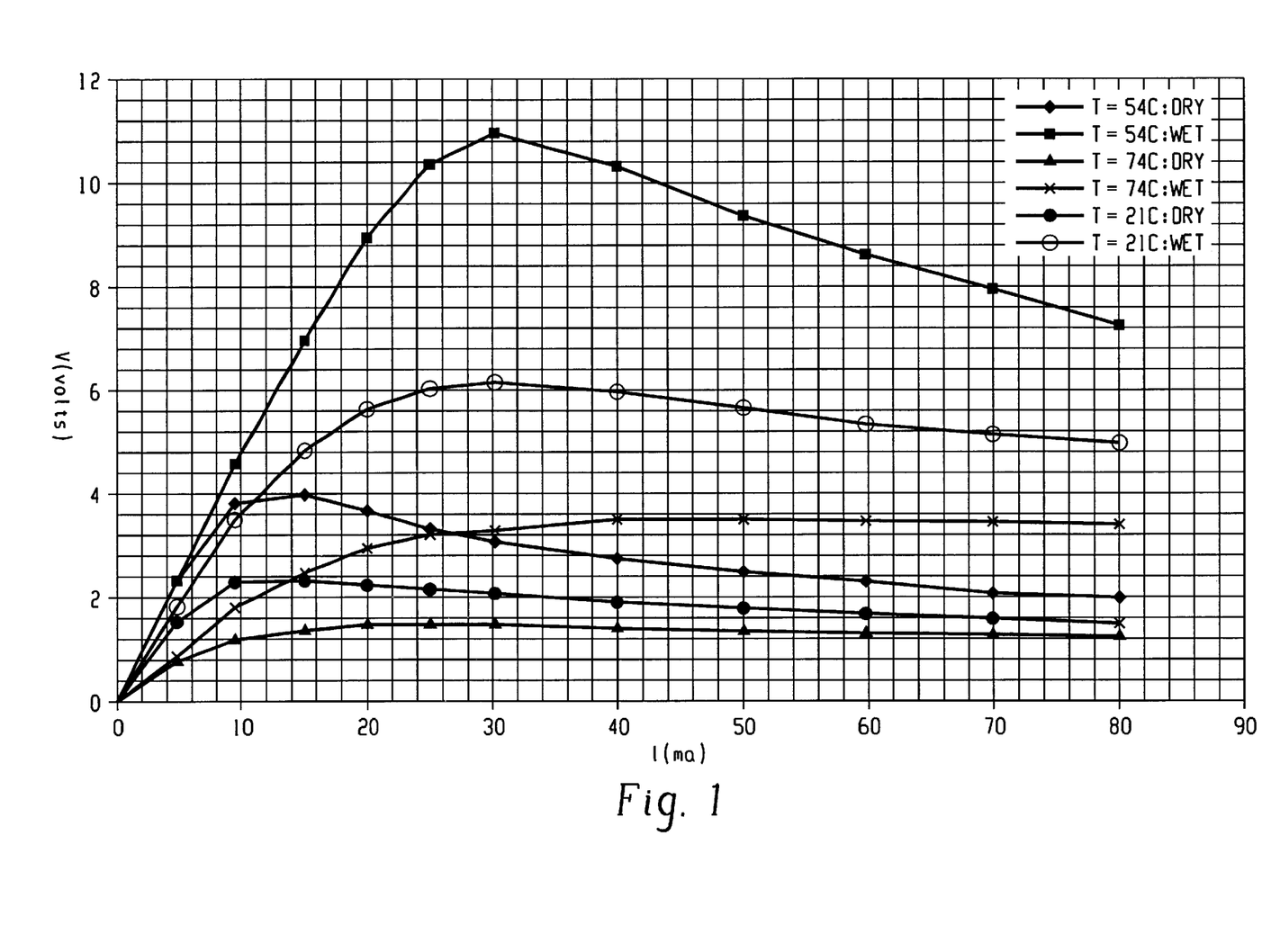
FIG. 1 is a graph of a plurality of curves representing the current vs. voltage (I/V) characteristics of a typical thermistor bead at various temperatures.

Sensing liquid level in a container, like fuel in an aircraft fuel tank, for example, has been performed using resistive bead type thermistors which have an inverse temperature coefficient. When current is conducted through a thermistor bead in air, i.e. a dry state, the bead increases in temperature due to self-heating and therefore exhibits a lower resistance to the current. In contrast, when the thermistor bead is submersed in a liquid, like jet fuel, for example, the bead is cooled due to the increased thermal conductivity of the surrounding liquid and its resistance to current conducted therethrough is increased. Current vs. voltage (I/V) characteristics of a typical thermistor bead at various temperatures is shown in the graph of FIG. 1. It is readily observable from the graph of FIG. 1 that the voltage across the thermistor becomes a viable measurement for detecting a wet vs. dry (wet/dry) state of the thermistor bead as the current conducted therethrough becomes greater than 45 milliamps.

For example, if the bead current is fixed at say 45 ma, and a voltage reference level is set at approximately 3.2 then for all temperatures within the range of −54° C. to +74° C., a bead voltage greater than the reference level indicates a wet state and vice versa. Thus, by passing a constant current equal to or greater than 45 ma through a thermistor bead and lowering the bead from the top of the container, it may be determined at what level in the container the thermistor bead becomes submersed into the liquid by detecting the wet/dry state thereof based on the voltage across the thermistor bead and a fixed reference voltage.

Figure 2:
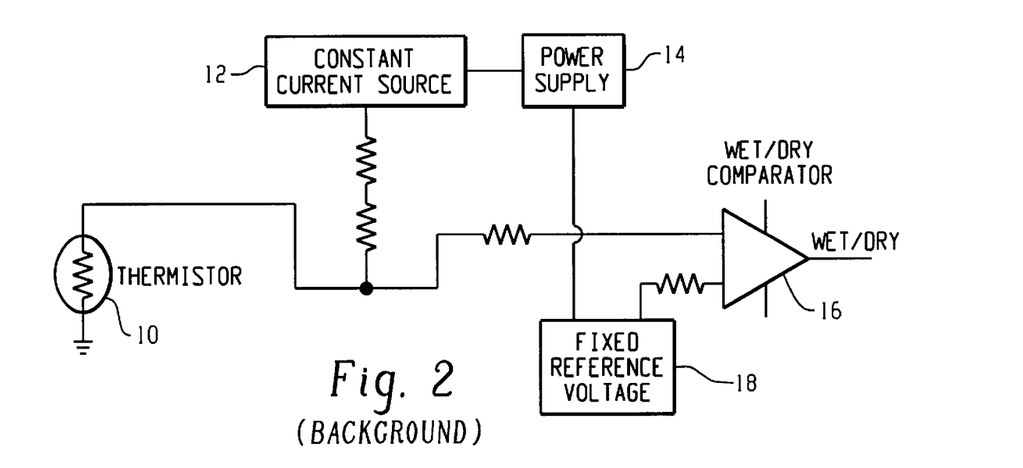
FIG. 2 is a schematic diagram of known thermistor bead interface circuitry for use as background in explaining the present invention.

Known interface circuitry which uses the above described method of detecting the dry/wet state of a thermistor bead is shown in the block diagram schematic of FIG. 2. Referring to FIG. 2, a thermistor bead 10 is coupled between a constant current source 12 and a common or ground return. The constant current source 12 is powered by a power supply 14 and is operative to conduct current through the thermistor bead 10. The voltage across the thermistor bead 10 is sensed by one input of a comparator circuit 16 which is also powered by the supply 14 and common return. A fixed reference voltage is generated by a circuit 18 which is powered by the supply 14. The comparator circuit 16 compares the reference voltage which is coupled to another input thereof with the thermistor bead voltage. When the thermistor bead voltage exceeds the reference voltage, a wet bead state is effected at the output of the comparator 16 and when the thermistor bead voltage is less than the reference voltage, a dry bead state is effected at the output of the comparator 16.

As noted above, to insure proper performance of the thermistor bead and detection circuitry using the above described method, the bead 10 should be biased with a constant current equal to or greater than 45 milliamps where voltage levels across the bead are dry/wet distinct for all practical temperature environments ( see the graphs of FIG. 1, for example). For level sensing of combustible liquids in a container with a thermistor bead, the bias current level of 45 milliamps may not be considered safe, and thus unacceptable. For example, the FAA has deemed this bias current level unacceptable in terms of the maximum allowable current that may enter an aircraft fuel tank. Only currents less than 30 milliamps RMS with justification have been deemed acceptable by the FAA for aircraft fuel tanks.

However, as the bead bias current is lowered to less than 30 ma, it is no longer possible to distinguish a wet bead state from a dry bead state based on the comparison of the bead voltage to a fixed reference voltage across a wide operating temperature range, like −54° C. to 74° C., for example, especially between a dry state at −54° C. and a wet state at 74° C. Accordingly, at bead currents less than 30 ma, a single thermistor bead may not be an acceptable level measurement sensor for combustible liquids across a wide operating temperature range using interface circuitry implementing the above described traditional method.

SUMMARY OF THE INVENTION

In accordance with one aspect of the present invention, a method of detecting a dry/wet state of a dual thermistor bead sensor over a wide operating temperature range comprises the steps of: conducting a first predetermined current through one of the thermistor beads of the sensor; conducting a second predetermined current through the other of the thermistor beads of the sensor, the second predetermined current being substantially less than the first predetermined current; measuring a first voltage across the one thermistor bead in response to the first predetermined current and generating a first signal representative thereof; measuring a second voltage across the other thermistor bead in response to the second predetermined current and generating a second signal representative thereof; modifying the second signal by an offset and gain to generate a third signal; and detecting the dry/wet state of the sensor over the wide operating temperature range based on the first and third signals. The first predetermined current is conducted through the one thermistor bead at an average current which renders the one thermistor bead a sense thermistor bead, and the second predetermined current is conducted through the other thermistor bead at an average current which renders the other thermistor bead a reference thermistor bead.

In accordance with another aspect of the present invention, apparatus for detecting a dry/wet state of a dual thermistor bead sensor over a wide operating temperature range comprises: a first circuit coupled to the sensor for conducting a first predetermined current through one of the thermistor beads of the sensor and for conducting a second predetermined current through the other of the thermistor beads of the sensor, the second predetermined current being substantially less than the first predetermined current; a second circuit coupled to the sensor for measuring a first voltage across the one thermistor bead in response to the first predetermined current and generating a first signal representative thereof; a third circuit coupled to the sensor for measuring a second voltage across the other thermistor bead in response to the second predetermined current and generating a second signal representative thereof; a fourth circuit coupled to the third circuit for modifying the second signal by an offset and gain to generate a third signal; and a fifth circuit for detecting the dry/wet state of the sensor over the wide operating temperature range based on the first and third signals.

In accordance with yet another aspect of the present invention, a method of detecting a dry/wet state of a dual thermistor bead sensor over a wide operating temperature range comprises the steps of: conducting a first predetermined current through one of the thermistor beads of said sensor; conducting a second predetermined current through the other of the thermistor beads of said sensor, said second predetermined current being substantially less than said first predetermined current; measuring a first voltage across said one thermistor bead in response to said first predetermined current and generating a first signal representative thereof; measuring a second voltage across said other thermistor bead in response to said second predetermined current and generating a second signal representative thereof; combining the first and second signals to generate a third signal; generating a reference signal; and detecting the dry/wet state of said sensor over said wide operating temperature range based on a comparison of said third signal to said reference signal.

In accordance with still another aspect of the present invention, apparatus for detecting a dry/wet state of a dual thermistor bead sensor over a wide operating temperature range comprises: a first circuit coupled to said sensor for conducting a first predetermined current through one of the thermistor beads of said sensor and for conducting a second predetermined current through the other of the thermistor beads of said sensor, said second predetermined current being substantially less than said first predetermined current; a second circuit coupled to said sensor for measuring a first voltage across said one thermistor bead in response to said first predetermined current and generating a first signal representative thereof; a third circuit coupled to said sensor for measuring a second voltage across said other thermistor bead in response to said second predetermined current and generating a second signal representative thereof; a fourth circuit coupled to said second and third circuits for combining the first and second signals to generate a third signal; and a fifth circuit for detecting the dry/wet state of said sensor over said wide operating temperature range based on a comparison of said third signal with a reference signal.

DETAILED DESCRIPTION OF THE INVENTION

Figure 3:
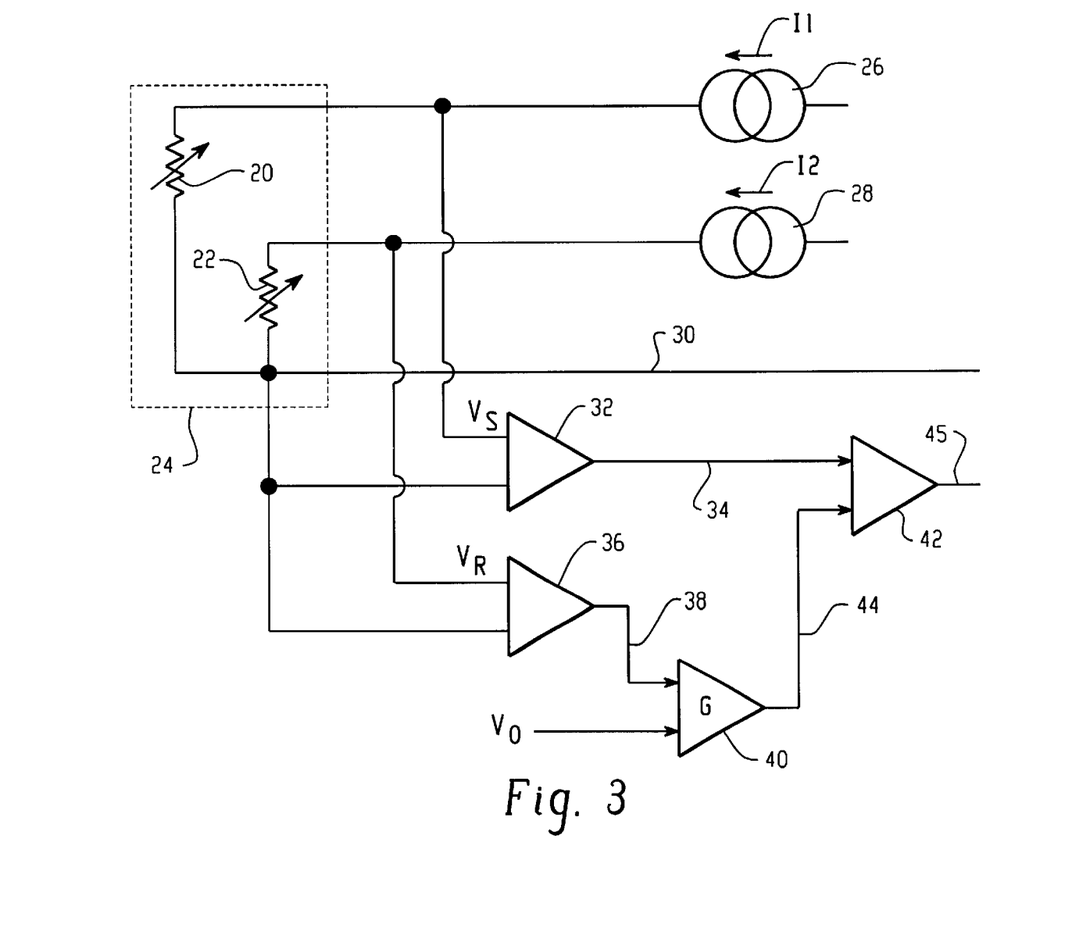
FIG. 3 is a schematic diagram of a dual thermistor bead sensor and detection circuitry suitable for embodying the broad principles of the present invention.

A dual thermistor bead sensor and detection circuitry suitable for embodying the broad principles of the present invention is shown in the schematic diagram of FIG. 3. Referring to FIG. 3, a sensor comprising dual thermistor beads 20 and 22 is disposed at a predetermined level in a container of liquid illustrated by the dashed line block 24. In the present embodiment, the thermistor beads 20 and 22 are in close proximity to each other, preferably only about a quarter of an inch (¼ in.) or approximately six centimeters (6 cm) apart and are both exposed directly to the environment of the container which covers a wide operating temperature range, like from −54° C. to +74° C., for example. Thus, as the liquid in the container 24 rises to the level of the sensor of thermistors 20 and 22, the sensor becomes wet and the thermistor beads 20 and 22 exhibit a change from dry to wet I/V characteristics at the environmental temperature thereof (see FIG. 1), and vice versa. In the present embodiment, the container 24 may be an aircraft fuel tank, for example.

In the embodiment of FIG. 3, current I1 is conducted through thermistor bead 20 at a sufficient level, which may be on average approximately 20 milliamps, for example, to render thermistor bead 20 a sense thermistor. That is, thermistor 20 will have sufficient current for self-heating that has a warming effect on the resistance of the bead. Thus, when dry or in air, the bead 20 exhibits no heat sinking from the air. However, when exposed to liquid or fuel, heat is conducted from the bead 20 to the liquid and the internal temperature of its resistance drops causing a substantial resistance change. And, the voltage across bead 20 in response to the current I1 will change accordingly. Within a narrow temperature range, the voltage across bead 20 in response to the fixed current I1 would be sufficient to determine the dry/wet state of the sensor even at currents below 30 ma. However, dry/wet state ambiguities would exist over a wide operating temperature range as noted above if the voltage across the sense bead 20 was the only state determining factor (see FIG. 1).

Also, in the embodiment of FIG. 3, current I2 is conducted through thermistor bead 22 from a current source 28. Current I2, which may be on average approximately 5 ma, for example, is substantially less than current I1 and causes little or no self-heating of bead 22. Consequently, the heat sinking effect between dry and wet states as explained above for bead 20 will not change the resistance of bead 22 substantially. It will only change as a result of an environmental temperature change. Accordingly, the voltage across bead 22 in response to the current I2 will change substantially only as a result of an environmental temperature change. Thus, in the present embodiment, the current I2 renders bead 22 a reference bead to reflect the effect of environmental temperature on a thermistor bead. As will become more apparent from the following description, the voltage across bead 22 may be modified for use as a reference voltage to the voltage of the sense bead 20 for determining dry/wet states of the sensor across the wide operating temperature range. Both currents I1 and I2 may be returned from the beads 20 and 22 over a return line 30.

The voltage across bead 20, which may be referred to as the sense voltage, $V_s$, is measured by an amplifier 32 which generates a first signal representative thereof over signal line 34. Likewise, voltage across bead 22, which may be referred to as the reference voltage, $V_R$, is measured by an amplifier 36 which generates a second signal representative thereof over signal line 38. The second signal is coupled to another amplifier which has an adjustable gain G and an adjustable voltage offset $V_O$. Thus, the second signal may be modified accordingly by the amplifier 40 by properly adjusting the gain and/or voltage offset thereof. The resulting modified signal is coupled to one input of a comparator circuit 42 over line 44 for use as a reference signal. The intent here is to permit adjustment of the offset and/or gain of amplifier 40 to produce a reference signal that varies in voltage inversely proportional to the environmental temperature and provides ample margin to avoid ambiguity between the wet and dry voltage states of bead 20 manifested by the first signal. The signal line 34 is coupled to another input of circuit 42 so that the first signal may be compared to the reference signal of line 44 in circuit 42 for determining without ambiguity the dry/wet state of the sensor thermistors 20 and 22 across the wide operating temperature range. In response to the comparison, circuit 42 generates a signal over line 45 indicative of the dry/wet state of the sensor.

Figure 4:
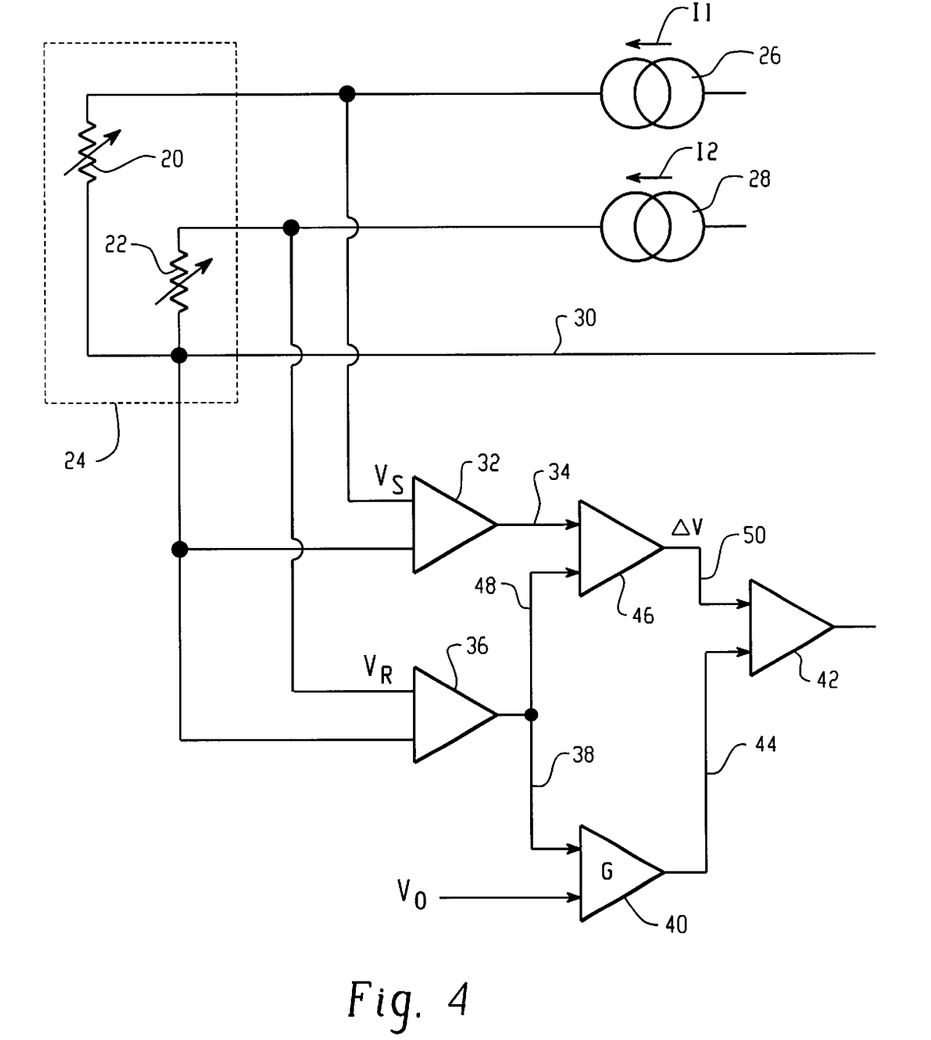
FIG. 4 is a schematic diagram of an alternate embodiment of the dual thermistor bead sensor and detection circuitry for use in describing another aspect of the present invention.

To provide a further margin to ambiguity, the first and second signals may be combined to produce a third signal for comparison to the reference signal for determining the dry/wet state of the sensor. An alternate circuit for embodying this aspect of the present invention is shown in the schematic of FIG. 4. The schematic of FIG. 4 will retain the same reference numerals for elements already described in connection with the embodiment of FIG. 3. Referring to FIG. 4, the first and second signals are coupled to corresponding inputs of a differential or summing amplifier 46 over lines 34 and 48, respectively. Amplifier 46 generates a third signal over line 50 representative of the combined first and second signals. Line 50 is coupled to an input of the comparator 42 so that the third signal may be compared with the reference signal for determining the dry/wet state of the sensor. In this embodiment, the second signal is subtracted from the first signal in amplifier 46 to produce a difference signal $\Delta V$ over line 50 for comparison with the reference signal in circuit 42.

Figure 5:
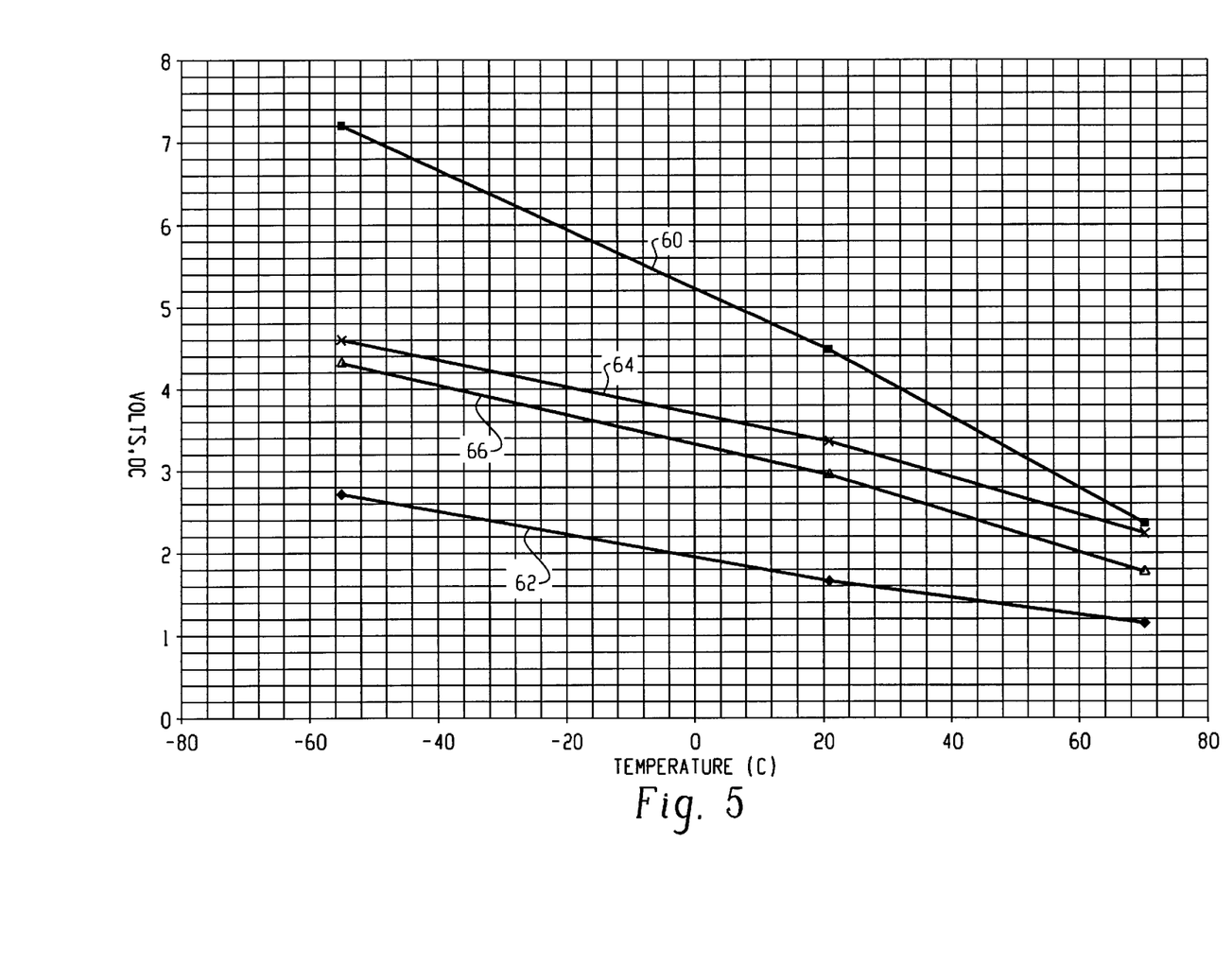
FIG. 5 is a graph of exemplary bead voltage vs. temperature curves over a wide temperature range for use in describing the operation of the embodiments of the present invention.

To illustrate the foregoing described aspect of the present invention, reference is made to the graph of FIG. 5. The difference signal derived from the combined voltages of beads 20 and 22 is exemplified in the wet and dry states across the temperature range from −54° C. to +74° C. by the lines 60 and 62, respectively. The reference signal derived from the modified voltage of the bead 22 is exemplified in the wet and dry states across the temperature range from −54° C. to +74° C. by the lines 64 and 66, respectively. Note that the reference voltage does not change substantially between the dry and wet states of bead 22 across the wide temperature range, but does change inversely proportional to temperature over such temperature range. As indicated above, the reference voltage may be modified by adjusting the offset and gain thereof to maintain a margin to ambiguity in determining the dry and wet states of the sensor across the wide temperature range. Preferably, the reference voltage is adjusted to maintain its voltage potential substantially half way between the wet and dry voltage potentials of the combined first and second signals across the wide temperature range.

Figure 6:
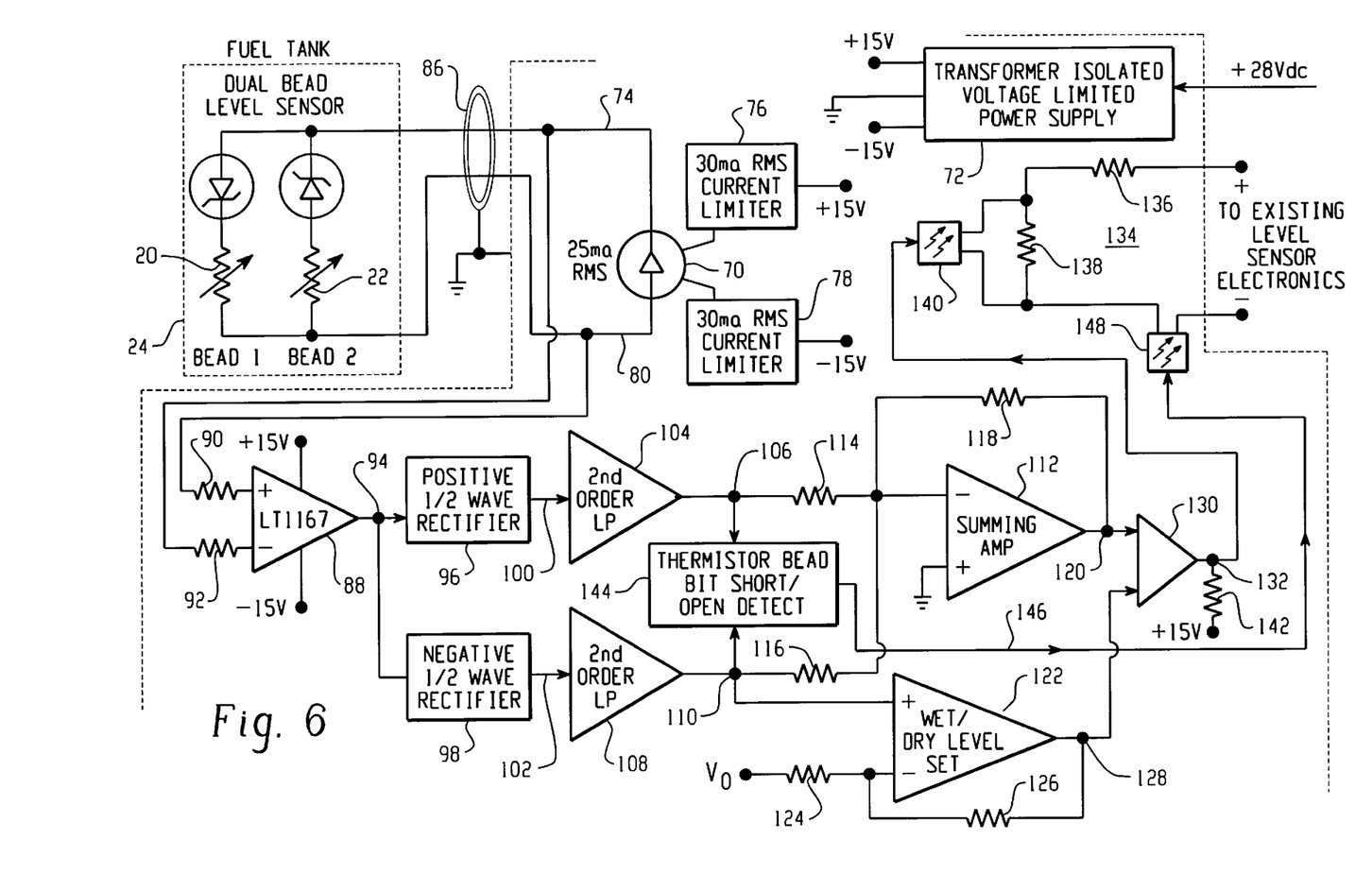
FIG. 6 is a schematic diagram of another embodiment of the dual thermistor bead sensor and detection circuitry for use in describing yet another aspect of the present invention.

An alternate embodiment of the present invention which is shown in the schematic of FIG. 6 accommodates a two wire sensor arrangement. In this embodiment, a single current source 70 is powered from positive and negative voltage sources, which may be on the order of +15V and −15V, respectively, for example. The positive and negative voltage sources are generated from a transformer isolated voltage limited power supply 72 driven from a power source which may be +28 volt aircraft power, for example. The current source 70 is operative to generate a periodic current waveform having positive and negative current duty cycle intervals over a signal line 74 for conduction through the dual bead level sensor comprising beads 20 and 22 as described herein above.

Figure 7:
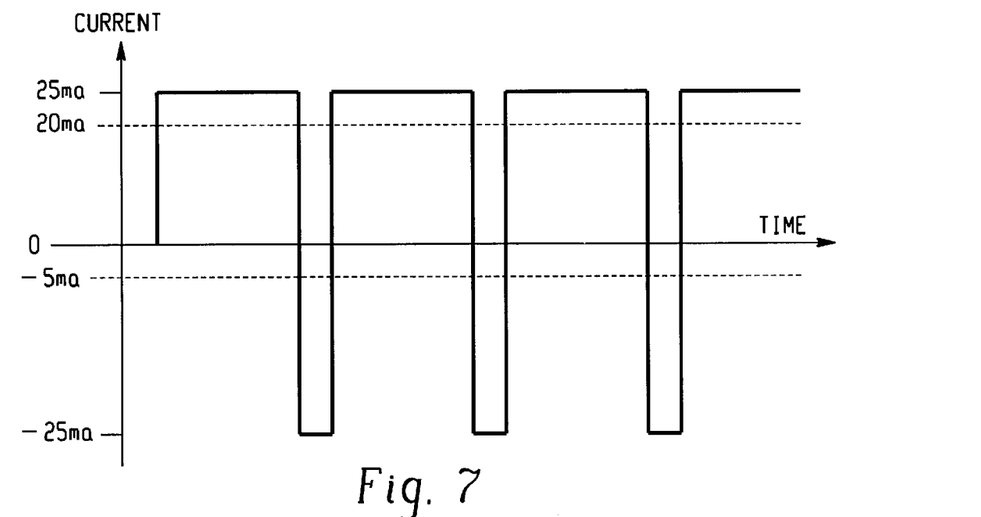
FIG. 7 is a time graph illustrating a current waveform suitable for use in the embodiment of FIG. 6.

The time graph of FIG. 7 illustrates an exemplary periodic current waveform at a frequency of approximately four kilohertz (4 KHz) suitable for generation by the current source 70. Referring to FIG. 7, a positive polarity current signal of 25 ma root mean square (RMS) is generated over duty cycles of 80% of the period of the waveform, which may be on the order of 0.25 milliseconds, for example, and a negative polarity current signal of 25 ma RMS is generated by the current source 70 over duty cycles of 20% of the period of the waveform. Current generation from the source 70 is limited by a +30 ma RMS current limiter 76 coupled in series with the +15V supply line and a −30 ma RMS current limiter 78 coupled in series with the −15V supply line. Current is returned from the sensor to the source 70 over signal line 80.

In the present embodiment, the beads 20 and 22 are coupled in parallel across the lines 74 and 80. A diode 82, which may be of the Schottky type, for example, is connected in series with bead 20 to permit only positive polarity current to be conducted through bead 20. Likewise, a diode 84, which also may be of the Schottky type is connected in series with bead 22 to permit only negative polarity current to be conducted through bead 22. Thus, if only positive polarity current is conducted through bead 20, then on average, approximately 20 ma of current is conducted through bead 20 based on a 80% periodic current waveform duty cycle, and if only negative polarity current is conducted through bead 22, then on average, approximately 5 ma of current is conducted through bead 22 based on a 20% periodic current waveform duty cycle. This is illustrated in the graph of FIG. 7. In the present embodiment, the lines 74 and 80 which provide the current signal to the level sensor within tank 24 may be covered by a grounded double overbraid layer 86 as a protective barrier against the environment.

In the sensor signal conditioning circuitry which is located outside of the tank 24, the voltage across lines 74 and 80 is measured by a differential instrumentation amplifier 88 which may be manufactured by Linear Technology, bearing model number LT1167, for example. More specifically, line 74 is coupled to a + input of amplifier 88 through a resistor 90 and line 80 is coupled to a − input of amplifier 88 through a resistor 92. Thus, amplifier 88 generates a voltage signal at its output 94 representative of the voltage across lines 74 and 80 which is a waveform that rises and settles at a positive voltage potential based on the resistance of bead 20 during the 80% duty cycle intervals of the current waveform and falls to a negative voltage potential based on the resistance of bead 22 during the 20% duty cycle intervals.

The output 94 is coupled to a positive ½ wave rectifier circuit 96 and a negative ½ wave rectifier circuit 98. The rectifier circuit 96 produces at its output 100 a waveform of positive polarity voltages only and the rectifier circuit 98 produces at its output 102 a waveform of negative polarity voltages only. The output 100 is coupled to a second order low pass filter circuit 104 which produces at its output 106 a first voltage signal representative of the average of the positive polarity voltages of the rectifier circuit 96, the first voltage signal being indicative of the voltage across bead 20. Similarly, the output 102 is coupled to another second order low pass filter circuit 108 which produces at its output 110 a second voltage signal representative of the average of the negative polarity voltages of the rectifier circuit 98, the second voltage signal being indicative of the voltage across bead 22.

The first and second voltage signals of outputs 106 and 110, respectively, are combined in an amplifier circuit 112. Particularly, outputs 106 and 110 are coupled to a −input of amplifier 112 through resistors 114 and 116, respectively, the + input of amplifier 112 being referenced to ground or common potential. A resistor 118 is coupled between the − input and output 120 of amplifier 112. In the present embodiment, resistors 114, 116 and 120 may all be on the order of one kiliohm rendering an amplifier closed loop gain of one. Since the second voltage signal at the output 110 is negative in polarity compared to the first voltage signal at the output 106, the summing amplifier 112 effectively subtracts the second voltage signal from the first voltage signal and generates a voltage signal at its output 120 representative of such difference.

The second voltage signal of output 110 is also coupled to a + input of another amplifier circuit 122. An adjustable offset voltage $V_O$ is coupled to a − input of the amplifier 122 through a resistor 124 and a resistor 126 is coupled between the − input and output 128 of amplifier 122. The ratio of resistor 126 to resistor 124 sets the closed loop gain of amplifier 122. One of both of the resistors 124 and 126 may be made adjustable for adjusting the gain of amplifier 122. Accordingly, the second voltage signal may be modified in offset and gain by the amplifier 122 to render the reference voltage signal at the output 128 preferably midway between the wet and dry combined voltage signals at output 120 across the entire wide temperature range as illustrated in the graph of FIG. 5. In essence, with proper modification, the reference voltage will track the temperature over the wide temperature range and remain with adequate margin between the wet and dry voltage signals of the thermistor beads of the level sensor.

The combined voltage signal of output 120 and the reference voltage signal of output 128 are coupled to respective inputs of a comparator circuit 130 wherein the combined voltage signal is compared to the reference voltage signal and a status signal is generated at the output 132 based on the result of such comparison. The status signal at output 132 is rendered in one state indicative of a wet thermistor bead condition and in another state indicative of a dry thermistor bead condition.

In the present embodiment, a circuit 134 is included to transmit the dry/wet status signal of output 132 to existing level sensor electronics in the aircraft. More specifically, a current, supplied from the aircraft electronics, is conducted through series connected resistors 136 and 138 which may be 20 ohms and 200 ohms, respectively, and the voltage induced thereacross is measured as an indication of the dry/wet state of the level sensor. An optically coupled switch 140 is coupled across resistor 138 and driven by the output 132 of comparator 130 via resistor 142 and the +15V supply. Accordingly, when the comparator output is in one state to drive the optically coupled switch, the resistor 138 is shunted and the voltage measured by the level sensor electronics is low preferably indicative of a dry thermistor condition, and when the output 132 is in another state, the optically coupled switch 140 remains open circuited, and the voltage measured by the level sensor electronics is high preferably indicative of a wet thermistor condition. In this manner, the level sensor electronics of the aircraft may determine the dry/wet state of the level sensor, and thus, the level of the liquid or fuel in the tank 24.

The present embodiment further includes a built-in-test (BIT) circuit 144 for detecting a fault condition, like open and short circuits in the signal wires coupled to the thermistors 20 and 22 of the level sensor, for example. Circuit 144 is coupled to the outputs 106 and 110 to monitor the first and second voltage signals thereof and output a signal over line 146 indicative of the operational state of the signal wiring. To provide this condition to the level sensor electronics, another optically coupled switch 148 is coupled in series with resistors 136 and 138 and driven by the signal over line 146. In operation, under normal operating conditions, circuit 144 drives the optically coupled switch 148 which completes the current path through resistors 136 and 138 permitting the aircraft electronics to monitor the dry/wet state of the level sensor. However, if the circuit 144 detects that either or both of the first and second voltage signals is or are outside of an expected operating signal range indicative of an open or short circuit condition, it terminates the drive signal to the optically coupled switch 148 which causes an open circuit to the current path through resistors 136 and 138. This open circuit condition is detected by the aircraft electronics through the voltage measurement.

The foregoing described sensor signal conditioning circuitry is powered by the transformer isolated power supply 72 at potentials of ±15 V and an isolated common. Note that in the present embodiment, this signal conditioning circuitry is isolated from the aircraft power supply +28V, for example, and instrumentation electronics either by transformer or optical coupling.

Figure 8:
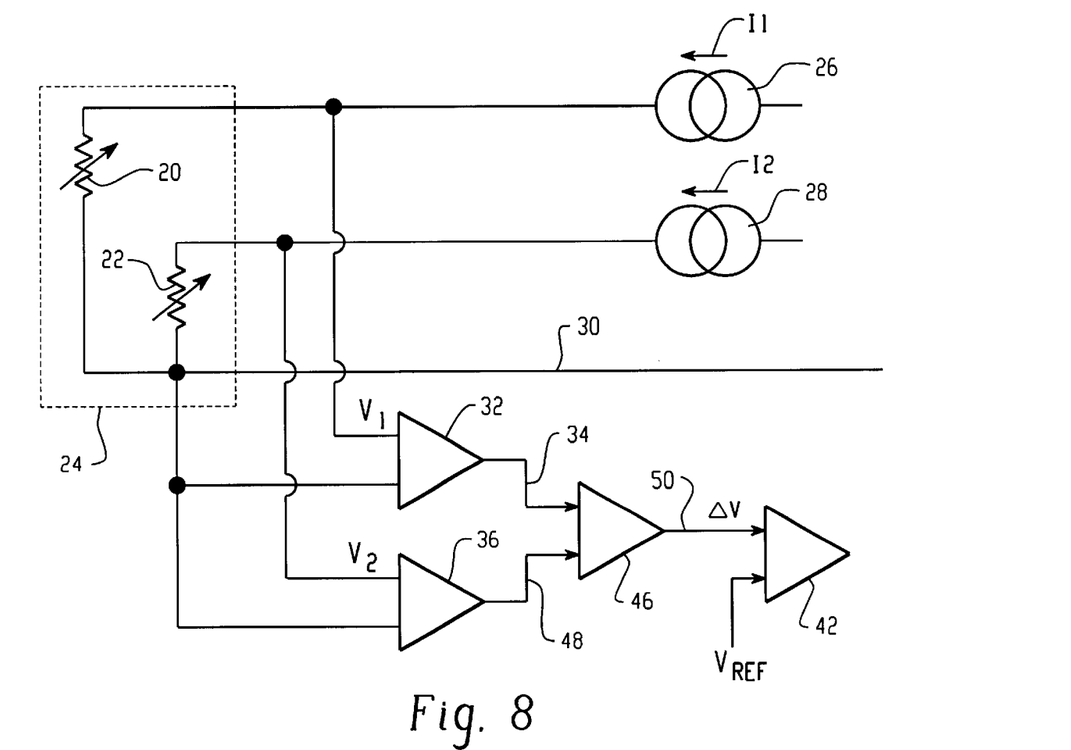
FIG. 8 is a schematic diagram of yet another embodiment of the dual thermistor bead sensor and detection circuitry for use in describing yet another aspect of the present invention.

Yet another embodiment of the present invention is shown in the schematic diagram of FIG. 8. This embodiment does not rely on one of the thermistor beads 22 and 24 being a reference thermistor bead. While different current levels are conducted through the two thermistor beads 22 and 24, both currents are at a level to cause self-heating in each thermistor bead. Accordingly, this embodiment does not operate with a temperature invariant "reference bead" as described in connection with the foregoing described embodiments.

Rather, as observed in the characteristic I/V, thermistor curves at the various temperatures as shown in FIG. 1, if one bead, like bead 20, for example, is excited with current at approximately 20 ma and the other bead, like bead 24, for example, is excited at approximately 10 ma, then in the present configuration, the difference in resulting voltages across the beads does not exceed 0.4 V over the wide temperature range for the dry state and does not fall below 1.4 V over the wide temperature range for the wet state. Thus, an approximate 1V margin between dry and wet states is yielded by the difference in resulting voltages over the wide temperature range. Therefore, the dry/wet state of the sensor may be determined in the present embodiment by comparing the difference in resulting voltages with a fixed reference voltage, which may be set to approximately 0.9V, for example.

Referring to FIG. 8, this embodiment is substantially similar to the embodiment of FIG. 4 with a modification in structure and operation as will become more evident from the following description. Reference numerals will remain the same for like components. Note that the amplifier 40 used for modifying the voltage across the bead 22 to produce the reference voltage has been omitted and replaced with a fixed voltage reference signal $V_{REF}$, which may be approximately 0.9 V. In this embodiment, the currents I1 and I2 produced by the sources 26 and 28 are approximately 20 ma and 10 ma, respectively. The resulting voltages across beads 20 and 22, referred to as V1 and V2, respectively, are measured by the amplifiers 32 and 36, respectively. The resulting V1 and V2 signals output from amplifiers 32 and 36, respectively, are subtracted in amplifier 46 to produce a difference voltage signal ΔV which is compared to the fixed voltage $V_{REF}$ in comparator 42. Based on said comparison, comparator 42 generates a signal in one state indicative of a dry condition of the sensor and in another state indicative of a wet condition of the sensor.

While in the foregoing described embodiments, the thermistor beads 20 and 22 of the sensor are described as configured in a parallel arrangement, it is understood that the beads could just as well be configured in a series arrangement without deviating from the broad principles of the present invention. In such a series arrangement, one current I2 may be conducted through both of the beads and the other current I1 may be conducted through only one of the beads. Thus, the other bead would have both currents I1 and I2 conducted therethrough. For example, if both I1 and I2 was generated at 10 ma, then only 10 ma is conducted through bead 22, while 20 ma is conducted through bead 20. The resulting voltages across the beads will be measured in the same manner as described in connection with the corresponding embodiments.

While the present invention has been described herein above in connection with a plurality of embodiments, it is understood that such embodiments and the description thereof were provided herein merely by way of example. Accordingly, there is no intent of limiting the present invention in any way, shape or form by such embodiments. Rather, the present invention should be construed in breadth and broad scope in accordance with the recitation of the claims appended hereto.

What is claimed is:

1. Method of detecting a dry/wet state of a dual thermistor bead sensor over a wide operating temperature range, said method comprising the steps of:
   conducting a first predetermined current through one of the thermistor beads of said sensor;
   conducting a second predetermined current through the other of the thermistor beads of said sensor, said second predetermined current being substantially less than said first predetermined current;
   measuring a first voltage across said one thermistor bead in response to said first predetermined current and generating a first signal representative thereof;
   measuring a second voltage across said other thermistor bead in response to said second predetermined current and generating a second signal representative thereof;
   modifying said second signal by an offset and gain to generate a third signal; and
   detecting the dry/wet state of said sensor over said wide operating temperature range based on said first and third signals.

2. The method of claim 1 wherein both of the first and second predetermined currents are conducted through the one and other thermistor beads, respectively, at less than 30 milliamps.

3. The method of claim 1 wherein the first predetermined current is conducted through the one thermistor bead at an average current which renders said one thermistor bead a sense thermistor bead, and the second predetermined current is conducted through the other thermistor bead at an average current which renders said other thermistor bead a reference thermistor bead.

4. The method of claim 3 wherein the first predetermined current is conducted through the one thermistor bead at an average current of approximately 20 milliamps, and the second predetermined current is conducted through the other thermistor bead at an average current of approximately 5 milliamps.

5. The method of claim 1 including the step of combining the first and second signals to generate a fourth signal and wherein the step of detecting includes detecting the dry/wet state of the sensor over the wide operating temperature range based on the third and fourth signals.

6. The method of claim 5 wherein the step of combining includes subtracting the second signal from the first signal to generate the fourth signal.

7. The method of claim 5 wherein the step of detecting includes generating a fifth signal indicative of the dry/wet state of the sensor based on a comparison of the fourth signal to the third signal.

8. The method of claim 1 wherein the step of conducting the first predetermined current includes conducting a third predetermined current through the one thermistor bead during first duty cycle intervals of a periodic current waveform; and wherein the step of conducting the second predetermined current includes conducting said third predetermined current through the other thermistor bead during second duty cycle intervals of said periodic current waveform, said first duty cycle interval being substantially greater in time than said second duty cycle interval.

9. The method of claim 8 wherein the step of measuring the first voltage includes averaging the voltages rendered across the one thermistor bead in response to the first duty cycle third current intervals and generating the first signal representative of said average voltage; and wherein the step of measuring the second voltage includes averaging the voltages rendered across the other thermistor bead in response to the second duty cycle third current intervals and generating the second signal representative of said average voltage.

10. The method of claim 9 wherein the step of step of modifying includes modifying the second average voltage signal by an offset and gain to generate the third signal.

11. The method of claim 10 including the step of subtracting the second average voltage signal from the first average voltage signal to generate a fourth signal; and wherein the step of detecting includes detecting the dry/wet state of the sensor over the wide operating temperature range based on the third and fourth signals.

12. Apparatus for detecting a dry/wet state of a dual thermistor bead sensor over a wide operating temperature range, said apparatus comprising:
   a first circuit coupled to said sensor for conducting a first predetermined current through one of the thermistor beads of said sensor and for conducting a second predetermined current through the other of the thermistor beads of said sensor, said second predetermined current being substantially less than said first predetermined current;
   a second circuit coupled to said sensor for measuring a first voltage across said one thermistor bead in response to said first predetermined current and generating a first signal representative thereof;
   a third circuit coupled to said sensor for measuring a second voltage across said other thermistor bead in response to said second predetermined current and generating a second signal representative thereof;
   a fourth circuit coupled to said third circuit for modifying said second signal by an offset and gain to generate a third signal; and
   a fifth circuit for detecting the dry/wet state of said sensor over said wide operating temperature range based on said first and third signals.

13. The apparatus of claim 12 wherein both of the first and second predetermined currents conducted by the first circuit through the one and other thermistor beads, respectively, are less than 30 milliamps.

14. The apparatus of claim 12 wherein the first predetermined current is conducted through the one thermistor bead at an average current which renders said one thermistor bead a sense thermistor bead, and the second predetermined current is conducted through the other thermistor bead at an average current which renders said other thermistor bead a reference thermistor bead.

15. The apparatus of claim 14 wherein the first predetermined current is conducted through the one thermistor bead at an average current of approximately 20 milliamps, and the second predetermined current is conducted through the other thermistor bead at an average current of approximately 5 milliamps.

16. The apparatus of claim 12 including a sixth circuit coupled to said second and third circuits for combining said first and second signals to generate a fourth signal; and wherein the fifth circuit is coupled to the fourth and sixth circuits for detecting the dry/wet state of the sensor over the wide operating temperature range based on the third and fourth signals.

17. The apparatus of claim 16 wherein the sixth circuit comprises a circuit for subtracting the second signal from the first signal to generate the fourth signal.

18. The apparatus of claim 16 wherein the fifth circuit comprises a comparator circuit for generating a fifth signal indicative of the dry/wet state of the sensor based on a comparison of the fourth signal to the third signal.

19. The apparatus of claim 12 wherein the first circuit comprises a circuit for conducting a third predetermined current through the one thermistor bead during first duty cycle intervals of a periodic current waveform, and for conducting said third predetermined current through the other thermistor bead during second duty cycle intervals of said periodic current waveform, said first duty cycle interval being substantially greater in time than said second duty cycle interval.

20. The apparatus of claim 19 wherein the second circuit comprises a circuit for averaging the voltages rendered across the one thermistor bead in response to the first duty cycle third current intervals and generating the first signal representative of said average voltage; and wherein the third circuit comprises a circuit for averaging the voltages rendered across the other thermistor bead in response to the second duty cycle third current intervals and generating the second signal representative of said average voltage.

21. The apparatus of claim 20 wherein the fourth circuit comprises a circuit for modifying the second average voltage signal by an offset and gain to generate the third signal.

22. The apparatus of claim 20 including a sixth circuit for subtracting the second average voltage signal from the first average voltage signal to generate a fourth signal; and wherein the fifth circuit is coupled to the fourth and sixth circuits for detecting the dry/wet state of the sensor over the wide operating temperature range based on the third and fourth signals.

23. The apparatus of claim 12 wherein the one and other thermistor beads of the sensor are connected together in parallel; and wherein the first circuit comprises a circuit for conducting a third predetermined current of a first polarity through the one thermistor bead of the sensor during first duty cycle intervals of a periodic current waveform, and for conducting said third predetermined current of a second polarity through the other thermistor bead of the sensor during second duty cycle intervals of said periodic current waveform, said first duty cycle interval being substantially greater in time than said second duty cycle interval.

24. The apparatus of claim 23 wherein the second circuit is coupled to the parallel combination of one and other thermistor beads of the sensor; wherein the second circuit comprises a circuit for rectifying the voltages rendered across said parallel combination of thermistor beads in response to the first duty cycle third current intervals and averaging said rectified voltage intervals to generate the first signal representative of said average voltage; and wherein the third circuit comprises a circuit for rectifying the voltages rendered across said parallel combination of thermistor beads in response to the second duty cycle third current intervals and averaging said rectified voltage intervals to generate the second signal representative of said average voltage.

25. The apparatus of claim 23 including a sixth circuit for subtracting the second average voltage signal from the first average voltage signal to generate a fourth signal; and wherein the fifth circuit is coupled to the fourth and sixth circuits for detecting the dry/wet state of the sensor over the wide operating temperature range based on the third and fourth signals.

26. The apparatus of claim 12 wherein both of the thermistor beads of the sensor are disposed in a container of liquid and are exposed to the environment of the container.

27. The apparatus of claim 26 wherein the container is an aircraft fuel tank.

28. The apparatus of claim 12 including a built in test circuit for detecting a fault condition in said apparatus.

29. The apparatus of claim 28 wherein the built in test circuit is coupled to the second and third circuits for monitoring the first and second signals to detect the fault condition.

30. The apparatus of claim 28 wherein the fault condition comprises at least one of the group of an open circuit and a closed circuit.

31. Method of detecting a dry/wet state of a dual thermistor bead sensor over a wide operating temperature range, said method comprising the steps of:
   conducting a first predetermined current through one of the thermistor beads of said sensor;
   conducting a second predetermined current through the other of the thermistor beads of said sensor, said second predetermined current being substantially less than said first predetermined current;
   measuring a first voltage across said one thermistor bead in response to said first predetermined current and generating a first signal representative thereof;
   measuring a second voltage across said other thermistor bead in response to said second predetermined current and generating a second signal representative thereof;
   combining the first and second signals to generate a third signal;
   generating a reference signal; and
   detecting the dry/wet state of said sensor over said wide operating temperature range based on a comparison of said third signal to said reference signal.

32. The method of claim 31 wherein both of the first and second predetermined currents are conducted through the one and other thermistor beads, respectively, at less than 30 milliamps.

33. The method of claim 31 wherein the first predetermined current is conducted through the one thermistor bead at an average current of approximately 20 milliamps, and the second predetermined current is conducted through the other thermistor bead at an average current of approximately 10 milliamps.

34. The method of claim 31 wherein the step of combining includes subtracting the first and second signals to generate a third signal representative of the difference between the first and second signals.

35. Apparatus for detecting a dry/wet state of a dual thermistor bead sensor over a wide operating temperature range, said apparatus comprising:

a first circuit coupled to said sensor for conducting a first predetermined current through one of the thermistor beads of said sensor and for conducting a second predetermined current through the other of the thermistor beads of said sensor, said second predetermined current being substantially less than said first predetermined current;

a second circuit coupled to said sensor for measuring a first voltage across said one thermistor bead in response to said first predetermined current and generating a first signal representative thereof;

a third circuit coupled to said sensor for measuring a second voltage across said other thermistor bead in response to said second predetermined current and generating a second signal representative thereof;

a fourth circuit coupled to said second and third circuits for combining the first and second signals to generate a third signal; and a fifth circuit for detecting the dry/wet state of said sensor over said wide operating temperature range based on a comparison of said third signal with a reference signal.

36. The apparatus of claim 35 wherein both of the first and second predetermined currents conducted by the first circuit through the one and other thermistor beads, respectively, are less than 30 milliamps.

37. The apparatus of claim 35 wherein the first predetermined current is conducted through the one thermistor bead at an average current of approximately 20 milliamps, and the second predetermined current is conducted through the other thermistor bead at an average current of approximately 10 milliamps.

38. The apparatus of claim 35 wherein the fourth circuit includes a circuit for subtracting the first and second signals to generate the third signal representative of the difference between the first and second signals.

* * * * *